Dec. 13, 1966   W. V. SMITH   3,291,491
SUBMARINE SHAFT SEAL AND THRUST COMPENSATOR
Filed Jan. 23, 1966   3 Sheets-Sheet 2

INVENTOR.
WATT V. SMITH
BY
*O. C. Hodges*
ATTY.

INVENTOR.
WATT V. SMITH

United States Patent Office 3,291,491
Patented Dec. 13, 1966

3,291,491
SUBMARINE SHAFT SEAL AND THRUST
COMPENSATOR
Watt V. Smith, 315 Old County Road, Severna Park, Md.
Filed Jan. 28, 1966, Ser. No. 523,804
7 Claims. (Cl. 277—27)

The invention described herein may be manufactured and used by or for the Government of the United States of America for governmental purposes without the payment of any royalties thereon or therefor.

This application is a continuation-in-part of my previously filed copending application Serial No. 254,843, filed January 29, 1963, now abandoned.

The present invention relates to submarine shaft seals and thrust compensators and more particularly to such thrust compensators where the compensating effect is produced through the use of the pressure of the fluid on the high pressure side of the seal.

It should be noted that while the device of the invention will be described with reference to its use on a submarine propulsion shaft, the invention will find utility on any shaft passing through a seal from a high pressure environment to one of lower pressure. The problems associated with the thrust caused by high pressure acting on a submarine propulsion shaft are taken then, as typical of the problems associated with any shaft so acted upon by a higher pressure at its one end than at the other end and the description of the use of the invention on such propulsion shafts is therefore intended as illustrative only and not as limiting the invention thereto.

A shaft through a submarine hull passes from the substantially atmospheric pressure maintained in the interior of the hull to the hydrostatic pressure of the water. This hydrostatic pressure even at moderate depths is so much greater than that prevailing in the boat's interior, that for purposes of thrust calculations the effect of the interior pressure may be ignored. The thrust then becomes the product of the effective shaft area and the hydrostatic head. This product may be presented in terms of effective area in square inches, the depth in feet and a constant representing the conversion from head in feet to pounds per square inch for seawater of average density as follows:

$$\text{Thrust} = \frac{(D+S)^2}{4} \times \pi \times P \times C$$

where

D = shaft diameter in inches
S = effective shaft diameter increase due to the seal (1½")
P = depth in feet
C = 0.435 for average seawater density For examplary purposes the thrust on the 7½-inch shaft with a nominal 1½-inch seal, at 1000 feet depth would be:

$$\pi \times \frac{81}{4} \times 1000 \times 0.435$$

or approximately 27,250 lbs. of thrust per 1000 feet of submergence.

Obviously when thrust of this magnitude is encountered the necessary thrust bearing becomes expensive (initially and in the necessary maintenance), space consuming and adds considerable weight that must be compensated for by the elimination of other equipment. Additionally the thrust so loads the bearing, that overcoming static friction after the shaft has been stopped becomes difficult if not impossible. Elaborate oil injection systems may be used to overcome this friction problem but only serve to increase weight, expense and complexity.

It is therefore an object of the invention to provide a submarine shaft seal and thrust compensator.

It is another object of the invention to provide a seal and thrust compensator that significantly reduces the weight of the shaft bearing system.

It is a final object of the invention to provide a seal and thrust compensator that achieves its thrust compensating effect through the use of the pressure of the fluid on the high pressure side of the seal.

Other objects and many of the attendant advantages of this invention will be readily appreciated as the same becomes better understood by reference to the following detailed description when considered in connection with the accompanying drawings wherein.

Figure 1:
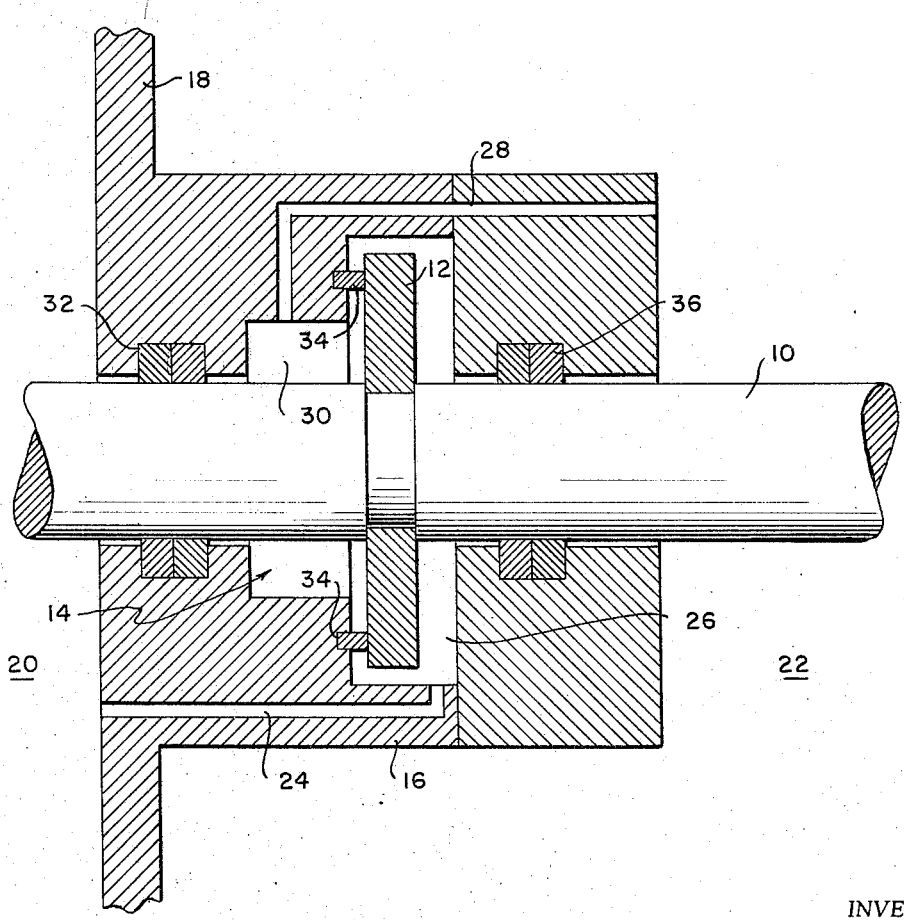
FIG. 1 is a diagramatic representation illustrating the operation of the invention.

The invention may be best understood by referring to FIG. 1. Briefly, the invention achieves its thrust compensating result by providing, on the shaft to be compensated (10) a compensating rotor ring 12. The rotor ring is enclosed in a chamber 14 formed in housing 16. The housing is attached to the hull 18.

Numeral 20 indicates the exterior of the vehicle which is normally immersed in water, that is, subjected during the operation of the vehicle to the hydrostatic pressure of the surrounding water. Numeral 22 indicates the interior of the vehicle which is normally at or near atmospheric pressure. Channel 24 provides hydraulic communication between the area 20 subject to water pressure and sub-chamber 26 within chamber 14. Channel 28 provides pneumatic communication between interior 22 and sub-chamber 30 within chamber 14.

Sub-chamber 30 is isolated from seawater pressure by seals 32 and 34. Sub-chamber 26 is maintained at seawater pressure by seals 34 and 36. The illustrated seals may be of any suitable construction and are shown in FIG. 1 diagrammatically for purposes of illustration.

Figure 2:
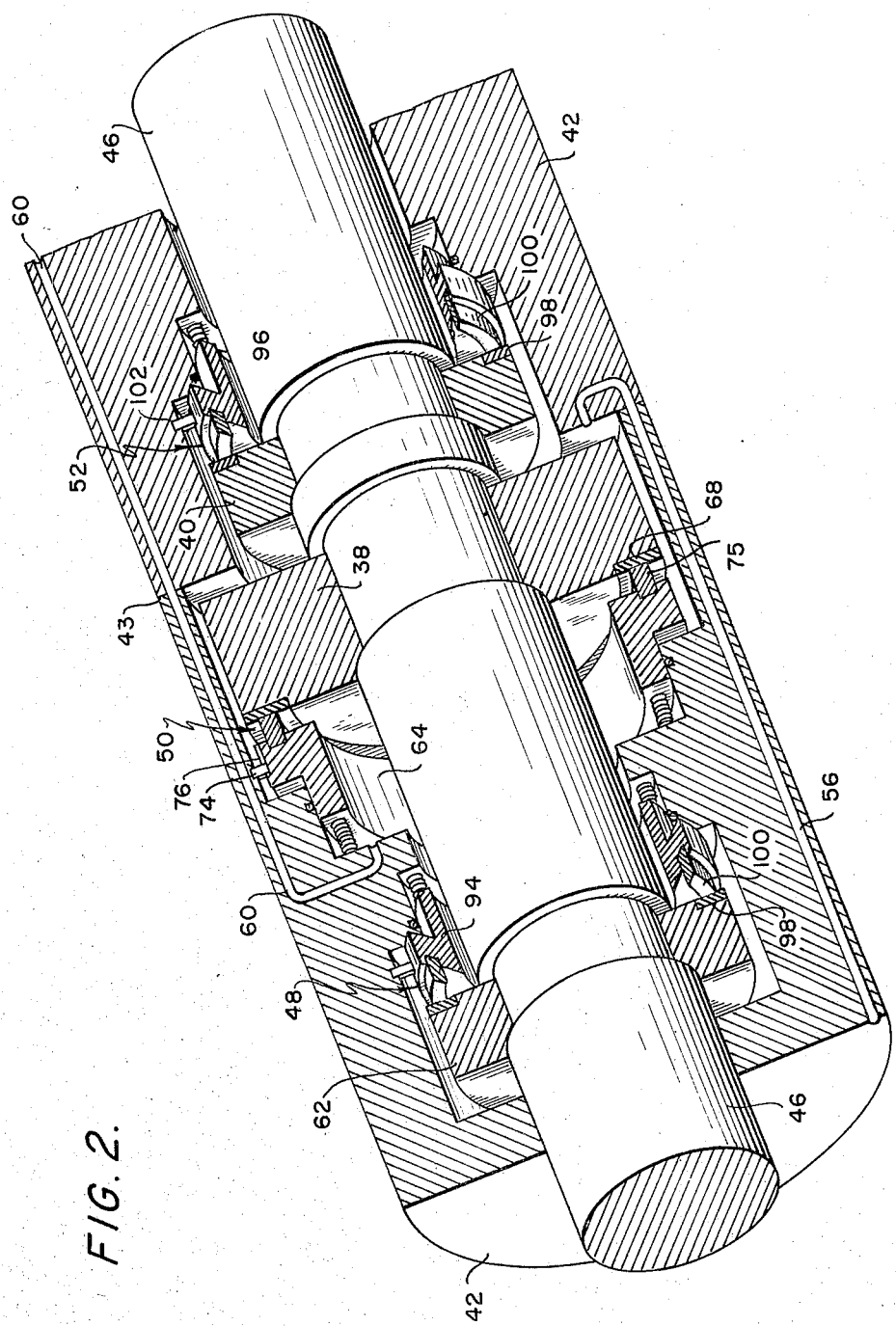
FIG. 2 is a perspective view, partly in section of a preferred embodiment of the invention.
Figure 3:
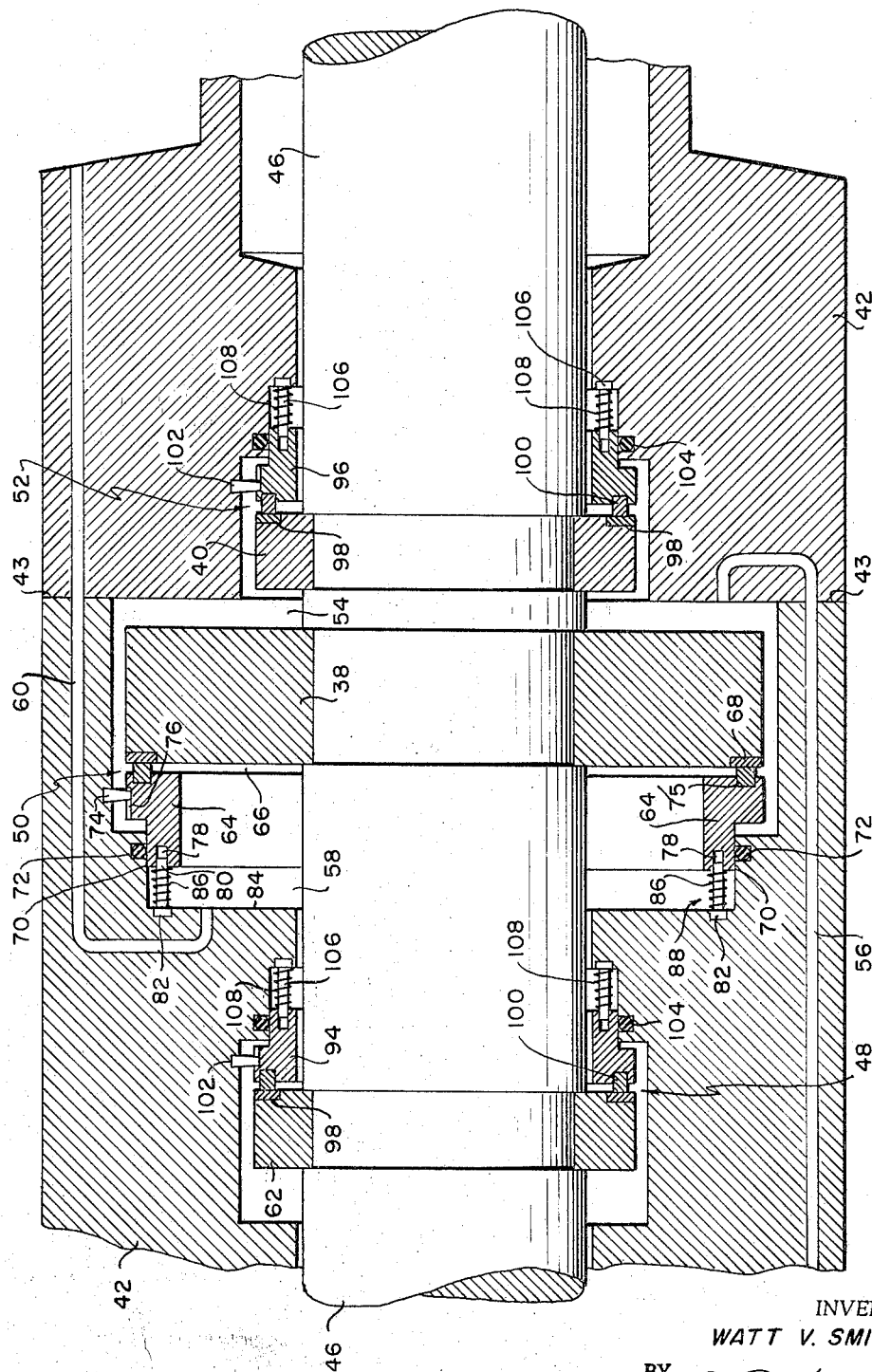
FIG. 3 is a side view, partly in section of the seal and thrust compensator of the preferred embodiment of FIG. 2.

A presently preferred embodiment of the invention is shown in FIG. 2 and FIG. 3. This embodiment shows the necessary seals spaced along the axis of the shaft. It should be noted however that other configurations of the seals are possible, for example both the front and rear faces of compensating rotor ring 38 may have sealing surfaces thereon thus eliminating rotor ring 40. The preferred embodiment then is intended as illustrative only and not in a limiting sense.

Referring now to FIG. 2 there is shown the shaft seal and thrust compensator of the invention. The device is enclosed in a two piece housing 42 joined by suitable means (not shown) at 43. Through the center of the housing runs the shaft 46 to be sealed and thrust compensated. Located along the shaft are three conventional face type ring pressure seals 48, 50, 52. The details of these seals will be described later with reference to FIG. 3 but for immediate purposes it is enough to note that seal 48 is subjected to ambient seawater pressure entering along shaft 46 from the exterior of the submarine at the left of the figure. Similarly seal 50 is subjected to seawater pressure admitted to cavity 54 by channel 56. Interior chamber 58 is maintained at the interior pressure of the submarine (hereinafter referred to as atmospheric) by channel 60 and by the sealing action of previously mentioned seals 48 and 50. Suitable drains (not shown) allow the removal from chamber 58 of leakage past the seals 48 and 50. Finally seal 52 prevents the entrance of the seawater pressure in chamber 54 into the interior of the submarine along the annulus between the shaft 46 and the housing 42. The novel thrust compensating effect of the device of the invention is achieved through the use of the large rotor ring 38 acted upon by ambient seawater pressure. As it will appear from FIG. 2 ring 38 is made considerably larger than rotor rings 40 or 62. The exact size being determined by the effective area acted upon by seawater in an axial direction toward the interior of the submarine (to the right in FIGS. 2 and 3). This effective area in the instant invention comprises the sum of (1) the area of shaft 46, (2) the exposed area on the seawater side (the left side in FIGS. 2 and 3) of rotor ring 62 and (3) the exposed area on the seawater side (the left side in FIGS. 2 and 3) of rotor ring 40. The first two of these elements are exposed directly to the seawater pressure and the last, by virtue of the pressure transmitted through channel 56. Since in each case the ambient seawater pressure appears on the left side of the elements as shown, the force or thrust generated will be to the right or interior of the submarine. It is this thrust that is compensated by the action of seawater pressure on the right or interior side or rotor ring 38. In order that the thrust be completely or nearly completely compensated, the right side area of rotor ring 38 acted upon by seawater pressure must be approximately equal to the sum of the three areas previously described or $$P(A_1+A_2+A_3)=PA_4$$

where

P = ambient seawater pressure
$A_1$ = shaft area
$A_2$ = exposed left face of rotor ring 62
$A_3$ = exposed left face of rotor ring 40
$A_4$ = exposed right face of rotor ring 38

It should be noticed that the above computation assumes that no part of the opposite faces of the respective rotor rings are exposed to seawater pressure. This would be strictly true only if the face type seals used were located at the outermost edge of the rotor ring and effected perfect sealing over a negligible area. In practice, however, as may be seen by reference to FIG. 3, the seals are located a finite distance away from the outermost edge of the respective rings and require a finite distance to effect their sealing function. The net effect of this additional area is small since the areas involved are small compared to the areas of the rotor rings and adequate thrust compensation may be achieved neglecting their effect.

Referring now specifically to FIG. 3, the detailed construction of the shaft seal and thrust compensator is shown. Each of the seals 48, 50 and 52 is similarly constructed and will be described with reference to the details of seal 50. The two principal components of that seal are the rotor ring 38 and the seal ring 64. The rotor ring 38 is fixedly attached to shaft 46 by suitable attachment means (not shown). Located on face 66 of the rotor ring near the outer periphery thereof, is hardened rotor face insert 68. Insert 68 may be made of any material having the requisite wearing characteristics, "Stellite," representing one such suitable material. Located adjacent the sealing face of the rotor 38 is the seal ring 64. This ring is constrained within the housing 42 to lineal movement along the axis of shaft 46 by sliding contact with cylindrical surface 70. Sealing of this sliding fit is accomplished by a conventional O-ring seal 72. The seal ring is restrained from rotation about the axis of shaft 46 by a plurality of tongues, (one of which is shown at 74) spaced around the casing wall and riding in grooves, such as at 76, in the seal ring. In the face of the seal ring, located adjacent to and parallel to the rotor ring 38, a sealing ring insert is retained. This insert is of a material that will not excessively wear the hardened surface of the rotor ring, and conventionally, may be of carbon. The opposite face of seal ring has a cylindrical recess 78 which receives a guide pin 80.

The guide pin has an enlarged end 82 which is received in a recess in wall 84 of housing 42 and secured therein by suitable means, not shown. Mounted over the guide pin is a spring 86 which biases the seal ring 64 toward rotor ring 38. A plurality of such guide pin assemblies, another of which is shown at 88, are located around the circumference of the seal ring. The actual number of such assemblies employed would depend on the size and weight of the seal ring, four being satisfactory in the illustrated embodiment.

Seals 48 and 52 differ from seal 50 only in the size of the rotor and seal rings and their associated parts and in the orientation of the sealing surfaces. The sealing surface for seals 48 and 52 is on the right face of the rotor rings 40 and 62 as shown in FIG. 3 rather than the left face as in seal 50. The seal rings 94 and 96 are therefore biased toward the right face of the rotor. The associated parts of seals 48 and 52 include: rotor face inserts 98, sealing ring inserts 100, tongues 102, O-rings 104, guide pins 106 and springs 108.

The three seals just described can be considered to close off the interior portion of the housing into two chambers 58 and 54. It is the action of the pressure maintained in these two chambers that accomplishes the purposes of the invention, that is, chamber 58 being maintained at atmospheric pressure by channel 60, exerts comparatively little pressure over the left face of rotor 38 while chamber 54 being maintained at the pressure of the water surrounding the vehicle exerts considerable pressure on the right face of rotor 38. It is this pressure acting over the comparatively large exposed area of rotor 38 that produces the compensating thrust that virtually cancels the thrust produced by the surrounding water pressure acting over the area of the shaft and the exposed portions of rotor rings 62 and 40. It should be noted that the compensating pressure in the chamber 54 may be produced other than by providing access to the surrounding water. For example, the seawater system on the submarine which is maintained at a pressure slightly above that of the ambient seawater could be used, or hydraulic oil maintained at a pressure determined according the submarine depth could be supplied. If either of these alternatives were employed the size of rotor ring 38 would be varied according to the pressure employed. A pressure higher than that of the surrounding water would permit the use of a smaller rotor ring.

Obviously many modifications and variations of the present invention are possible in the light of the above teachings. It is therefore to be understood that within the scope of the appended claims the invention may be practiced otherwise than as specifically described.

What is claimed is:

1. A shaft seal and thrust compensator for use on a shaft having one end thereof subjected to an environment of high pressure and the other end thereof subjected to an environment of relatively lower pressure, said shaft thereby being normally under the influence of an axial thrust directed toward said end subjected to said relatively low pressure, said shaft seal and thrust compensator comprising:

a shaft housing having an interior chamber;
a shaft extending through said housing and chamber;
first seal means between said shaft and housing sealing said chamber from said high pressure environment;
second seal means between said shaft and housing sealing said chamber from said lower pressure environment;
thrust compensating means fixedly mounted on said shaft intermediate said first and second sealing means;
third seal means between said thrust compensating means and said housing sealing a first sub-chamber within said chamber from a second sub-chamber within said chamber, said first sub-chamber being located between said first and said third seal means and said second sub-chamber being located between said second and said third seal means;

means for maintaining a pressure in said first sub-chamber; and means for maintaining a pressure in said second sub-chamber;

said pressure maintained in said first sub-chamber being less than said pressure maintained in said second sub-chamber;

said thrust compensating means having a substantial radial area facing on said second sub-chamber, whereby the action of the difference in pressure between said first sub-chamber and said second sub-chamber on said thrust compensating means produces an axial compensating thrust directed toward said high-pressure end of said shaft thereby partially or wholly counter-acting the effect of said normal axial thrust.

2. The device of claim 1 wherein, when said shaft seal and thrust compensator are employed on a vessel;

said high pressure is the ambient pressure of the water surrounding said vessel; and said relatively lower pressure is the atmospheric pressure maintained within said vessel.

3. The device of claim 2 wherein said means for maintaining a pressure in said second sub-chamber is a hydraulic connection between said ambient pressure of the water surrounding said vessel and said second sub-chamber;

whereby said second sub-chamber is maintained at said ambient pressure of the water surrounding said vessel.

4. The device of claim 1 wherein:

said thrust compensating means comprises a cylindrical thrust compensating rotor ring;

said third seal means comprises a compensating seal ring constrained from rotation about the axis of shaft and biased along the axis of said shaft into sealing contact with said thrust compensating rotor ring.

5. The device of claim 4 wherein:

said first and second seal means comprise rotor rings and seal rings;

said seal rings being constrained from rotation about the axis of said shaft and biased along the axis of said shaft into sealing contact with said rotor rings.

6. The device of claim 5 wherein:

said rotor rings and said compensating rotor ring have hardened rotor face inserts;

said seal rings and said compensating seal ring having seal ring inserts therein, arranged so as to be biased into contact with said hardened rotor face inserts.

7. The device of claim 4 wherein:

the radial area of said thrust compensating rotor ring exposed to said ambient pressure of the water surrounding said vessel is substantially equal to the sum of the area of the shaft and the radial areas of said rotor rings associated with said first and said second seals exposed to said ambient pressure of the water surrounding said vessel;

whereby the normal axial thrust toward the end of said shaft subjected to said relatively lower pressure is substantially cancelled by the oppositely directed thrust produced at said thrust compensating means.

References Cited by the Examiner
UNITED STATES PATENTS

| | | | |
|---|---|---|---|
| 2,777,702 | 1/1957 | Rodal | 277—27 XR |
| 2,966,375 | 12/1960 | Vegezzi | 277—15 |
| 3,179,422 | 4/1965 | Phillips | 277—3 |

SAMUEL ROTHBERG, *Primary Examiner.*